United States Patent

Mohr et al.

[11] Patent Number: 6,034,204
[45] Date of Patent: Mar. 7, 2000

[54] CONDENSATION PRODUCTS OF BASIC AMINO ACIDS WITH COPOLYMERIZABLE COMPOUNDS AND A PROCESS FOR THEIR PRODUCTION

[75] Inventors: Bernhard Mohr; Dieter Boeckh; Ralf Nörenberg; Sherri Randall; Rajan Panandiker; Eugene Paul Gosselink; LeeAnn Luipold, all of Ludwigshafen, Germany

[73] Assignee: BASF Aktiengesellschaft, Ludwigshafen, Germany

[21] Appl. No.: 09/131,282

[22] Filed: Aug. 7, 1998

Related U.S. Application Data

[60] Provisional application No. 60/055,152, Aug. 8, 1997.
[51] Int. Cl.$^7$ .................................................. C08G 69/10
[52] U.S. Cl. .......................... 528/328; 528/288; 528/289; 528/302; 528/303; 528/306; 528/310; 528/332; 528/341; 528/345
[58] Field of Search ...................... 528/288, 289, 528/302, 303, 306, 310, 328, 332, 341, 345

[56] References Cited

U.S. PATENT DOCUMENTS

| | | |
|---|---|---|
| 3,651,023 | 3/1972 | Ottenheym et al. . |
| 4,126,628 | 11/1978 | Paquet . |
| 4,892,927 | 1/1990 | Meyer et al. . |
| 4,959,452 | 9/1990 | Meyer et al. . |
| 5,028,689 | 7/1991 | Heinz et al. . |
| 5,639,723 | 6/1997 | Kroner et al. .......................... 510/476 |

*Primary Examiner*—Nathan M. Nutter
*Attorney, Agent, or Firm*—Oblon, Spivak, McClelland, Maier & Neustadt, P.C.

[57] ABSTRACT

Condensation products of basic amino acids with copolymerizable compounds which are obtainable by condensing (a) a basic amino acid selected from the group consisting of lysine, arginine, ornithine, tryptophane and mixtures thereof, (b) a copolymerizable compound selected from the group consisting of saturated monobasic carboxylic acids, unsaturated mono-basic carboxylic acids, polybasic carboxylic acids, carboxylic acid anhydrides, diketenes, monohydroxycarboxylic acids, polyhydroxycarboxylic acids and mixtures thereof, and optionally (c) at least one compound selected from the group consisting of amines, lactams, non-proteinogenic acids, alcohols, alkoxylated alcohols, alkoxylated amines, amino sugars, carbohydrates and sugar carboxylic acids in a molar ratio of (a):(b) of from 100:1 to 1:1 at a temperature of at least 120° C., and a process for the production of said condensation products by condensing compounds (a) and (b) and optionally (c) at a temperature of from 120° to 300° C.

14 Claims, No Drawings

CONDENSATION PRODUCTS OF BASIC AMINO ACIDS WITH COPOLYMERIZABLE COMPOUNDS AND A PROCESS FOR THEIR PRODUCTION

CROSS REFERENCE

Under Title 35, U.S.C. 119(e), this Application claims the benefit of Provisional Application Ser. No. 60/055,152, filed Aug. 8, 1997.

DESCRIPTION

Technical Field

The present invention relates to condensation products of basic amino acids with copolymerizable compounds and to a process for their production.

Background of the Invention

U.S. Pat. No. 5,028,689 relates to thermoplastically moldable slightly branched aliphatic copolyamides of high molecular weight with increased melt viscosities. The copolyamides are prepared by polycondensing a monomer mixture of one or more lactams, amino-carboxylic acids, diamine/dicarboxylic acid mixtures, or mixtures thereof, in the presence of small quantities of, for instance, lysine or a lysine ester of a lower alcohol, and approximately equivalent in quantity to the free amino group of lysine or the lysine ester, of a polycarboxylic acid. The quantity of lysine used results in copolyamides containing of from 0.1 to 1.0% by weight of lysine segments. The combination of lysine and polycarboxylic acids added to the monomer reaction mixture before the onset of the reaction without prior salt formation drastically increases the speed of polyamide formation.

According to U.S. Pat. No. 4,892,927 thermoplastically deformable, high molecular weight polyamides are prepared by the polycondensation of polyamide-forming, aliphatic diamine/dicarboxylic acid mixtures in the presence of small amounts of α-amino-ε-caprolactam whereas according to U.S. Pat. No. 4,959,452 predominantly aliphatic polyamide are obtained by hydrolytic polymerization of at least one polyamide-forming lactam in the presence of from 0.1 to 2% by weight of α-amino-ε-caprolactam and an equivalent quantity of polycarboxylic acid. These polyamides are used for making films and fibers.

U.S. Pat. No. 3,651,023 relates to a polyamide composition which is obtained by polymerizing caprolactam in the presence of, for example, lysine in such an amount that the polymer contains of from 0.5 to 5% by weight lysine. Fibers and yarns are made from these polymers.

U.S. Pat. No. 4,126,628 relates to a process for monoacylation of diamino acids such as lysine, ornithine and α,γ-diaminobutyric acid by reacting the said acids with succinimidyl esters of carboxylic acids or substituted carbonic acids in approximately equimolar amounts at 25 to 50° C. in the presence of a basic catalyst to give a pH of at least about 10. The N-acyl amino acid products have utility as surface active agents, as pharmacuticals or as intermediates for pharmaceuticals.

It is the object of the invention to provide new condensation products of basic amino acids.

SUMMARY OF THE INVENTION

The above object is achieved with condensation products of basic amino acids with copolymerizable compounds which are obtainable by condensing (a) a basic amino acid selected from the group consisting of lysine, arginine, ornithine, tryptophane and mixtures thereof, (b) a copolymerizable compound selected from the group consisting of saturated monobasic carboxylic acids, unsaturated mono-basic carboxylic acids, polybasic carboxylic acids, carboxylic acid anhydrides, diketenes, monohydroxycarboxylic acids, polyhydroxycarboxylic acids and mixtures thereof, and optionally (c) at least one compound selected from the group consisting of amines, lactams, non-proteinogenic acids, alcohols, alkoxylated alcohols, alkoxylated amines, amino sugars, carbohydrates and sugar carboxylic acids in a molar ratio of (a):(b) of from 100:1 to 1:1 at a temperature of at least 120° C.

The condensation products contain, in condensed form, for example the compounds (a) and (b) in a molar ratio of from 100:1 to 2:1, more preferably in a molar ratio of from 50:1 to 2:1 and most preferred in a molar ratio of from 20:1 to 5:1.

In cases where the condensation products additionally contain compounds (c) in condensed form the molar ratio of (a) to (c) is for example of from 100:1 to 1:20 and preferably of from 100:1 to 1:5.

Compounds of group (a) are lysine, arginine, ornithine, tryptophane and their mixtures. These compounds may be used in the form of their hydrates, their esters with lower alcohols or their salts, for instance their sulfates, hydrochlorides or acetates. The esters of the basic amino acids are preferably derived from monovalent C1 to C4-alcohols such as methanol, ethanol, n-propanol, isopropanol, n-butanol, sec.-butanol or tertiary butanol. When hydrochlorides are used, approximately equivalent quantities of a base should be added to the reaction mixture for neutralization of hydrogen chloride. Sodium hydroxide and potassium hydroxide are the preferred bases. If a monohydrochloride of a basic amino acid is used, one equivalent of a base is necessary whereas in case of dihydrochlorides two equivalents are required. Lysine hydrate and aqueous solutions of lysine are preferably used as component (a). Lysine can also be used in form of its cyclic lactam, i.e. α-amino-ε-caprolactam.

The copolymerizable compounds (b) are selected from the group consisting of saturated monobasic carboxylic acids, unsaturated monobasic carboxylic acids, polybasic carboxylic acids, carboxylic acid anhydrides, diketenes, monohydroxycarboxylic acids, monobasic polyhydroxycarboxylic acids and mixtures thereof. Examples of saturated monobasic carboxylic acids are formic acid, acetic acid, propionic acid, butyric acid, valeric acid, capric acid, octanoic acid, nonanoic acid, decanoic acid, lauric acid, palmitic acid, stearic acid, arachidic acid, behenic acid, myristic acid, undecanoic acid, 2-ethyl hexanoic acid, and all naturally occuring fatty acids and mixtures thereof.

Examples of unsaturated monobasic carboxylic acids are acrylic acid, methacrylic acid, crotonic acid, sorbic acid, oleic acid, linoleic acid, and erucic acid.

Examples of polybasic carboxylic acids are oxalic acid, fumaric acid, maleic acid, malonic acid, succinic acid, itaconic acid adipic acid, aconitic acid, suberic acid, azeleic acid, pyridinedicarboxylic acid, furandicarboxylic acid, phthalic acid, terephthalic acid, diglycolic acid, glutaric acid, substituted C4-dicarboxylic acid, sulfosuccinic acid, C1- to C26-alkylsuccinic acids, C2- to C26-alkenylsuccinic acids, 1,2,3-propanetricarboxylic acids, 1,1,3,3-propanetetracarboxylic acids, 1,1,2,2-ethanetetracarboxylic acid, 1,2,3,4-butanetetracarboxylic acid, 1,2,2,3- propanetetracarboxylic acid, 1,3,3,5-pentanetetracarboxylic acid, 1,2,4-benzenetricarboxylic acid, and 1,2,4,5-benzenetetracarboxylic acid. Polybasic carboxylic acids which can form carboxylic anhydrides are also suitable as compounds (b), for example succinic anhydride, mono and dianhydride of butanetetracarboxylic acid, phthalic anhydride, acetylcitric anhydride, maleic anhydride, itaconic anhydride, and aconitic anhydride.

Examples of diketenes which may be used as component (b) are alkyl diketenes having 1 to 30 carbon atoms. These diketenes may be characterized by the following formula:

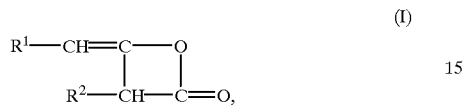

(I)

wherein the substituents $R^1$ and $R^2$ have the same meaning or are different H, $C_1$- to $C_{30}$-, preferably $C_6$- to $C_{22}$-saturated or ethylenically unsaturated alkyl. Compounds of formula (I) are for example diketene, methyl diketene, hexyl diketene, cyclohexyl diketene, octyl diketene, decyl diketene, dodecyldiketene, palmityl diketene, stearyl diketene, oleyl diketene, octadecyl diketene, eicosyl diketene, docosyl diketene, and behenyl diketene.

Examples of monohydroxycarboxylic acids are malic acid, tartronic acid, citric acid, and isocitric acid. Polyhydroxycarboxylic acids are for example tartaric acid, mucic acid, glyceric acid, bis(hydroxymethyl)propinonic acid, gluconic acid, and hydroxylated unsaturated fatty acids such as dihydroxystearic acid.

The condensation products of basic aminoacids with at least one of compounds (b) may optionally contain in condensed form at least one compound (c) selected from the group consisting of amines, lactams, non-proteinogenic amino acids, alcohols, alkoxylated alcohols, alkoxylated amines, amino, sugars, carbohydrates and sugar carboxylic acids. Examples of amines are:

aliphatic and cycloaliphatic amines, preferably methylamine, ethylamine, propylamine, butylamine, pentylamine, hexylamine, heptylamine, octylamine, nonylamine, decylamine, undecylamine, dodecylamine, tridecylamine, stearylamine, palmitylamine, 2-ethylhexylamine, isononylamine, hexamethyleneimine, dimethylamine, diethylamine, dipropylamine, dibutylamine, dihexylamine, ditridecylamine, N-methylbutylamine, N-ethylbutylamine; alicyclic amines, preferably cyclopentylamine, cyclohexylamine, N-methylcyclohexylamine, N-ethylcyclohexylamine, dicyclohexylamine;

diamines, triamines and tetraamines, preferable ethylenediamine, propylenediamine, butylenediamine, neopentyldiamine, hexamethylendiamine, octamethylenediamine, imidazole, 5-amino-1,3-trimethylcyclohexylmethylamine, diethylenetriamine, dipropylenetriamine, tripropyltetraamine, 4,4'-methylenebiscyclohexylamine, 4,4'-methylenebis(2-methylcyclohexlyamine), 4,7-dioxadecyl-1,10-diamine, 4,9-dioxadodecyl-1,12-diamine, 4,7,10-trioxatridecyl-1,13-diamine, 2-(ethylamino)ethylamine, 3-(methylamino)propylamine, 3-(cyclohexylamino)propylamine, 3-(2-aminoethyl)aminopropylamine, 2-(diethylamino)ethylamine, 3-(dimethylamino)propylamine, dimethyldipropylenetriamine, 4-aminomethyloctane-1, 8-diamine, 3-(diethylamino)propylamine, N,N-diethyl-1,4-pentanediamine, diethylenetriamine, dipropylenetriamine, bis(hexamethylene)triamine, aminoethylpiperazine, aminopropylpiperazine, N,N-bis(aminopropyl)methylamine, N,N-bis(aminopropyl)ethylamine, N,N-bis(aminopropyl)methylamine, N,N-bis(aminopropyl)ethylamine, N,N-bis(aminopropyl)hexylamine, N,N-bis(aminopropyl)octylamine, N,N-dimethyldipropylenetriamine, N,N-bis(3-dimethylaminopropyl)amine, N,N'-1,2-ethanediylbis-(1,3-propanediamine), N-(aminoethyl)piperazine, N-(2-imidazole)piperazine, N-ethylpiperazine, N-(hydroxyethyl)piperazine, N-(aminoethyl)piperazine, N-(aminopropyl)piperazine, N-(aminoethyl)morpholine, N-(aminopropyl)morpholine, N-(aminoethyl)imidazole, N-(aminopropyl)imidazole, N-(aminoethyl)hexamethylenediamine, N-(aminopropyl)hexamethylenediamine, N-(aminoethyl)ethylenediamine, N-(aminopropyl)ethylenediamine, N-(aminoethyl)butylenediamine, N-(aminopropyl)butylenediamine, bis(aminoethyl)piperazine, bis(aminopropyl)piperazine, bis(aminoethyl)hexamethylenediamine, bis(aminopropyl)hexamethylenediamine, bis(aminoethyl)ethylenediamine, bis(aminopropyl)ethylenediamine, bis(aminoethyl)butylenediamine, bis(aminopropyl)butyl-enediamine, aliphatic amino alcohols, preferably 2-aminoethanol, 3-amino-1-propanol, 1-amino-2-propanol, 2-(2-aminoethoxy)ethanol, 2-[2-aminoethyl)amino]ethanol, 2-methylaminoethanol, 2-(ethylamino)ethanol, 2-butylaminoethanol, diethanolamine, 3-[(hydroxyethyl)amino]-1-propanol, diisopropanolamine, bis(hydroxyethyl)aminoethylamine, bis(hydroxypropyl)aminoethylamine, bis(hydroxyethyl)aminopropylamine, bis (hydroxypropyl) aminopropylamine;

glucoseamine, melamine, urea, guanidine, polyguanides, piperidine, morpholine, 2,6-dimethylmorpholine and tryptamine.

The polymerizable compound is preferably selected from hexamethylonediamine, octylamine, monoethanolamine, octamethylenediamine, diaminododecane, decylamine, dodecylamine and mixtures thereof.

As component (c) it is also possible to use lactams. The lactams contain for example 5 to 13 atoms in the ring. Suitable lactams include are butyrolactam, caprolactam and laurolactam.

The condensation products may optionally contain as component (c) non-proteinogenic acids in condensed form. Examples of such acids are anthranilic acid, N-methylamino substituted acids such as N-methylglycine, dimethylaminoacetic acid, ethanolaminoacetic acid, N-carboxymethylamino acids, nitrilotriacetic acid, ethylenediamineacetic acid, ethylenediaminotetraacetic acid, diethylentriaminepentaacetic acid, hydroxyethylenediaminotriacetic acid, diaminosuccinic acid, C4- to C26-aminoalkylcarboxylic acids such as 4-aminobutyric acid, 6-aminocaproic acid, and 11-aminoundecanoic acid.

The condensation products may also optionally contain alcohols in condensed form. The alcohols may be derived from monohydric alcohols of for example 1 to 22 carbon atoms, e.g. methanol, ethanol, n-propanol, isopropanol, n-butanol, isobutanol, tertiary butanol, pntanol, hexanol, 2-ethyl hexanol, cyclohexanol, octanol, decanol, dodecanol, palmityl alcohol, stearyl alcohol, and behenyl alcohol. Other suitable alcohols are polyols such as ethylene glycol, propylene glycol, glycerol, polyglycerols having 2 to 8 glycerol units, erythritol, pentaerythritol, and sorbitol. The alcohols may also be alkoxylated. Examples for such compounds are the addition products of from 1 to 200 mol of a $C_2$- to $C_4$-alkylene oxide with one mol of the alcohol mentioned. Suitable alkylene oxides are for example ethylene oxide, propylene oxide and butylene oxides. Preference is given to using ethylene oxide and propylene oxide, or to adding ethylene oxide and propylene oxide or vice versa, to the alcohol. Of interest are in particular the addition products of 3 to 20 mol of ethylene oxide with 1 mol of $C_{13}/C_{15}$ oxo process alcohols or with fatty alcohols. The alcohols may if desired also contain a double bond, such as oleyl alcohol.

As component (c) it is also possible to use alkoxylated amines, for example the addition products of from 5 to 30 mol of ethylene oxide with 1 mol of stearylamine, oleylamine or palmitylamine.

As component (c) it is also possible to use naturally occuring amino sugars, such as chitosamine or chitosan, and also compounds obtained from reducing carbohydrates by reductive amination, such as aminosorbitol.

The condensation products may also optionally contain in condensed form carbohydrates such as glucose, sucrose, dextrins, starch and degraded starch, maltose and sugarcarboxylic acids such as gluconic acid, glucaric acid, gluconolactone, and glucuronic acid.

Preferred condensation products are obtainable by condensing
(a) lysine and
(b) at least one compound selected from the group consisting of palmitic acid, stearic acid, lauric acid, octanoic acid, propionic acid, acetic acid, 2-ethylhexanoic acid, adipic acid, succinic acid, citric acid and mixtures thereof.

Also preferred are condensation products which are obtainable by condensing
(a) a basic amino acid selected from the group consisting of lysine, arginine, ornithine, tryptophane and mixtures thereof with
(b) at least one compound of the group consisting of saturated carboxylic acids, unsaturated carboxylic acids, polybasic carboxylic acids, carboxylic acid anhydrides, monohydroxycarboxylic acids, polyhydroxycarboxylic acids and mixtures thereof and
(c) at least one compound of the group consisting of amines, lactams having 5 to 13 atoms the ring, non-proteinogenic aminocarboxylic acids, alcohols, alkoxylated alcohols, alkoxylated amines, amino sugars, carbohydrates and sugar carboxylic acids in a molar ratio of (a):(b) of form 100:1 to 2:1 and (a):(c) of from 20:1 to 1:20.

More preferred condensation products are obtainable by condensing
(a) lysine,
(b) at least one compound selected from the group consisting of palmitic acid, stearic acid, lauric acid, octanoic acid, propionic acid, acetic acid, 2-ethylhexanoic acid, adipic acid, succinic acid, citric acid and mixtures thereof, and
(c) at least one compound of the group consisting of epsilon-caprolactam, laurolactam, aminocaproic acid, aminolauric acid and mixtures thereof
in a molar ratio of (a) to (b) of from 100:1 to 2:1 and (a):(c) of from 10:1 to 1:10 and condensation products which are obainable by condensing (a) a basic amino acid selected from the group consisting of lysine, arginine, ornithine, tryptophane, and mixtures thereof,
(b) at least one alkyldiketene having 1 to 30 carbon atoms in the alkyl group and optionally
(c) at least one compound of the group consisting of amines, lactans, non-proteinogenic amino acids, alcohols, alkoxylated alcohols, alkoxylated amines, amino sugars, carbohydrates, sugar carboxylic acid, and mixtures thereof.

The invention further relates to a process for the production of condensation products of basic amino acids with copolymerizable compounds, which comprises condensing
(a) a basic amino acid selected from the group consisting of lysine, arginine, ornithine, tryptophane and mixtures thereof,
(b) a copolymerizable compound selected from the group consisting of saturated monobasic carboxylic acids, unsaturated mono-basic carboxylic acids, polybasic carboxylic acids, carboxylic acid anhydrides, diketenes, monohydroxycarboxylic acids, polyhydroxycarboxylic acids and mixtures thereof, and optionally
(c) at least one compound selected from the group consisting of amines, lactams, non-proteinogenic amino acids, alcohols, alkoxylated alcohols, alkoxylated amines, amino sugars, carbohydrates and sugar carboxylic acids
in a molar ratio of (a):(b) of from 100:1 to 1:1 at a temperature of at least 120° C.

In the process according to the invention the molar ratio of (a):(b) is preferably of from 100:1 to 2:1, more preferably 50:1 to 2:1 and most preferred of from 20:1 to 5:1.

Preferred terpolymers are obtained by condensing
(a) a basic amino acid selected from the group consisting of lysine, arginine, ornithine, tryptophane and mixtures thereof is condensed,
(b) at least one compound of the group consisting of saturated carboxylic acids, unsaturated carboxylic acids, polybasic carboxylic acids, carboxylic acid anhydrides, diketenes, monohydroxycarboxylic acids, polyhydroxycarboxylic acids and mixtures thereof and
(c) at least one compound of the group consisting of amines, lactams, non-proteinogenic acids, alcohols, alkoxylated alcohols, alkoxylated amines, amino sugars, carbohydrates and sugar carboxylic acids
in a molar ratio of (a):(b) of from 100:1 to 2:1 and (a) to (c) of from 20:1 to 1:20 at a temperature of from 140 to 300° C.

Other preferred terpolymers are produced by condensing
(a) a basic amino acid selected from the group consisting of lysine, arginine, ornithine, tryptophane, and mixtures thereof,
(b) at least one alkyldiketene having 1 to 30 carbon atoms in the alkyl group and
(c) at least one compound of the group consisting of amines, lactams having 5 to 13 atoms in the ring, alcohols, alkoxylated alcohols, alkoxylated amines, amino sugars, carbohydrates, sugarcarboxylic acids, and mixtures thereof
at temperatures of from 140° to 240° C.

The most preferred binary condensation products are obtained by condensing
(a) lysine and
(b) at least one compound selected from the group consisting of palmitic acid, stearic acid, lauric acid, oleic acid, crotonic acid, linoleic acid, octanoic acid, propionic acid, acetic acid, adipic acid, 2-ethylhexanoic acid, succinic acid, citric acid and mixtures thereof.

The condensation can be carried out in substance, in an organic solvent or in an aqueous medium. It is of advantage to conduct the condensation in water at a concentration of (a) and (b) of from 10 to 98% by weight at a temperature of from 120° to 300° C. In a preferred embodiment of the process according to the invention the condensation is carried out in water at a concentration of (a) and (b) and optionally (c) of from 20 to 70% by weight under pressure at a temperature of from 140° to 250° C. The condensation of the compounds (a) and (b) and optionally (c) can also be carried out in an organic solvent such as dimethylformamide, dimethylsulfoxide, dimethylacetamide, glycol, polyethylene glycol, propylene glycol, polypropylene glycol, monovalent alcohols, addition products of ethylene oxide and/or propylene oxide to monovalent alcohols, to amines or to carboxylic acids. The condensation of compounds (a) and (b), can, for example, be started in the presence of water either in an aqueous solution or in an organic solvent containing water. The condensation of the compounds can be carried out in the presence of water. Alternatively, water may be distilled off before the compounds are condensed. The condensation can also be carried out under removal of water. During the condensation water is formed. The water formed during the condensation is preferably removed from the reaction mixture. This can be carried out under superatmospheric pressure, under normal pressure or under reduced pressure. The condensation time depends on the choice of reaction conditions. In general it will be within the range from 1 minute to 50 hours, preferably from 30 minutes to 16 hours. Polycondensates having a low molecular weight can also be prepared in a pressure-tightly sealed vessel by removing only some if any of the water formed in the course of the polycondensation.

If desired, the condensation can be carried out in the presence of a mineral acid as catalyst. The concentration of the mineral acid, with reference to (a) and (b) and optionally (c), may be of from 0.001 to 5, preferably of from 0.01 to 1.0% by weight. Examples of suitable mineral acids are hypophosphorous acid, hypodiphosphorous acid, phosphorous acid, hydrochloric acid, sulfuric acid and their mixtures. In addition to the acids their alkali, ammonium and alkaline earth metal salts can be used as catalyst. As an alternative, those compounds (c) which form ammonium salts with the said acids can also be condensed with lysine or the other basic amino acids.

The condensation products of (a) and (b) have for example a molecular weight of from 300 to 20,000, preferably of from 500 to 5000. They are generally soluble in water or can be easily dispersed therein. The condensation products may be used as additive for detergents. The condensation products provide appearance and integrity benefits to fabrics laundered with detergents containing them.

The weight average molecular weights (Mw) are measured by aqueous gel permeation chromatography (GPC) using a mixture of acetonitrile and water 20/80 v/v as the mobile phase, Waters Ultrahydrogel 500, 250, 250, 120 columns and UV detection at a wavelength of 230 nm. Pullulane standards with narrow molecular weight distributions were used for the calibration.

EXAMPLE 1

Condensation product of L-lysine propionic acid and ε-caprolactam in an molar ratio of 5:5:1.

684 g of an 60% aqueous solution of L-lysine (365.2 g, 2.5 mol), epsilon-caprolactam (282.9 g, 2.5 mol), propionic acid (37.0 g, 0.5 mol) and sodium hypophosphite were placed in a 2 l reaction vessel equipped with an efficient stirrer and distillation head. The solution is heated under a constant stream of nitrogen to 170° C. for 1 h as water distills from the reaction mixture. Following this, a water pump vacuum is applied for 1 h to remove residual amounts of solvent and volatile products. The reddish, slightly viscous melt is cooled to 125° C. and 620 g water are added slowly to result in a clear red solution. This solution is further cooled to room temperature and adjusted to a pH of approximately 7.5 with concentrated sulfuric acid (80 g) to form about a 50% stock solution. The molecular weight of the polymer was determined to Mw=3550.

EXAMPLE 2

Condensation product of L-lysine and adipic acid in a molar ratio of 5:1.

L-lysine monohydrate (410.5 g, 2.5 mol), adipic acid (73.1 g, 0.5 mol) sodium hypophosphite (0.1 g) and water (176 g) were placed in a 2 l reaction vessel equipped with an efficient stirrer and distillation head. The solution is heated under a constant stream of nitrogen to 152° C. for 5 h as water distills from the reaction. Following this, a water pump vacuum is applied for 1 h to remove residual amounts of solvent and volatile products. The reddish, slightly viscous melt is cooled to 140° C. and 400 g water are added slowly to result in a clear red solution after 30 min. of stirring. This solution is further cooled to room temperature and adjusted to a pH of approximately 7.5 with concentrated sulfuric acid (72 g) to form about a 50% stock solution. The molecular weight of the polymer was determined to MW=2160.

EXAMPLE 3

Condensation product of L-lysine and lauric acid in a molar ration of 5:1.

L-lysine monohydrate (365.2 g, 2.5 mol), lauric acid (100.16 g, 0.5 mol) sodium hypophosphite (0.1 g) and water (176 g) were placed in a 2 l reaction vessel equipped with an efficient stirrer and distillation head. The solution is heated under a constant stream of nitrogen to 160° C. for 5 h as water distills from the reaction. Following this, a water pump vacuum is applied for 4 h to remove residual amounts of solvent and volatile products. The reddish, slightly viscous melt is cooled to 140° C. and 400 g water are added slowly to result in a clear red solution after 30 min of stirring. This solution is further cooled to room temperature and adjusted to a pH of approximately 7.5 with concentrated sulfuric acid (72 g) to form about a 50% stock solution. The molecular weight of the polymer was determined to Mw=3150.

EXAMPLE 4

Condensation product of L-lysine, aminocaproic acid and adipic acid in a molar ratio of 10:10:1.

684 g of an 60% aqueous solution of L-lysine (365.2 g, 2.5 mol), aminocaproic acid (327.9 g, 2.5 mol), adipic acid (36.5 g, 0.25 mol) and sodium hypophosphite (0.1 g) were placed in a pressurizable 2.5 l reaction vessel and blanketed with nitrogen. The reaction vessel was then sealed pressure tight and heated to 200° C. for 7 h, during which time the internal pressure rose to 6.6 bar. The reaction mixture was then cooled to result in a yellow viscous solution with a solid content of approx. 66%. 200 g of this solution were subjected to a water pump vacuum for 2 h at a temperature of 170° C. to 180° C. to remove solvent and volatile products. The resulting red solid was dissolved in water and adjusted to a pH of approximately 7.5 with concentrated sulfuric acid to form an approx. 48.6% stock solution.

EXAMPLE 5

Condensation product of L-lysine, epsilon-caprolactam and propionic acid in a molar ratio of 5:5:1.

684 g of an 60% aqueous solution of L-lysine (365.2 g, 2.5 mol), epsilon-caprolactam (282.9 g, 2.5 mol), propionic acid (37.0 g, 0.5 mol) and sodium hypophosphite (0.1 g) were placed in a pressurizable 2.5 l reaction vessel and blanketed with nitrogen. The solution was heated to 160° C. for as water (317 g) distilled from the reaction mixture. The reaction vessel was then sealed pressure tight and heated to 200° C. for 4 h, during which time the internal pressure rose to 3.75 bar. The pressure was then slowly released to atmospheric pressure to remove water from the reaction mixture. Following this, a water pump vacuum was applied for 0.5 h to remove residual amounts of solvent and volatile products. The viscous melt was cooled to 125° C. and 620 g water are added slowly to result in a clear red solution, which was further cooled to ambient temperature. 600 g of this solution were adjusted to a pH of approximately 7.5 with concentrated sulfuric acid to form an approx. 53.0% stock solution. The molecular weight of the polymer was determined to be Mw=4090 g mol-1.

EXAMPLE 6

Condensation product of L-lysine, epsilon-caprolactam and $C_{14}/C_{16}$-alkyldiketene in a molar ratio of 10:10:1.

L-lysine monohydrate (821 g, 5 mol), epsilon-caprolactam (565.8 g, 5 mol) and sodium hypophosphite (0.1 g) were placed in a pressurizable 2.5 l reaction vessel and blanketed with nitrogen. The solution was heated to 192° C. for approx. 1 h as water distilled from the reaction mixture. The reaction vessel was then sealed pressure tight and heated to 200° C. for 7 h, during which time the internal pressure rose to 7.25 bar. The pressure was then slowly released to atmospheric pressure to remove solvent and volatile products from the reaction mixture. Subsequently, $C_{14}/C_{16}$-alkyldiketene (50.4 g, 0.5 mol) was slowly added to the reaction mixture and heating was continued for 2 h under a constant stream of nitrogen. The melt is cooled to 100° C. and 1200 g water are added slowly to result in a brownish, viscous suspension which was cooled to ambient temperature. 200 g of this material were adjusted to a pH of approximately 7.5 with citric acid to form a suspension with a solid content of approx. 40.6%.

We claim:

1. Condensation products of basic amino acids with copolymerizable compounds which are obtainable by condensing
   (a) a basic amino acid selected from the group consisting of lysine, arginine, ornithine, tryptophane and mixtures thereof,
   (b) a copolymerizable compound selected from the group consisting of saturated monobasic carboxylic acids, unsaturated monobasic carboxylic acids, polybasic carboxylic acids, carboxylic acid anhydrides, diketenes, monohydroxycarboxylic acids, polyhydroxycarboxylic acids and mixtures thereof, and optionally
   (c) at least one compound selected from the group consisting of amines, lactams, non-proteinogenic acids, alcohols, alkoxylated alcohols, alkoxylated amines, amino sugars, carbohydrates and sugar carboxylic acids in a molar ratio of (a):(b) of from 100:1 to 1:1 at a temperature of at least 120° C.

2. Condensation products as claimed in claim 1, wherein the molar ratio of (a) basic amino acid to copolymerizable compound (b) is of from 100:1 to 2:1.

3. Condensation products as claimed in claim 1 wherein the molar ratio of (a) basic amino acid to copolymerizable compound (b) is of from 50:1 to 2:1.

4. Condensation products as claimed in claim 1, wherein the molar ratio of (a) basic amino acid to copolymerizable compound is of from 20:1 to 5:1.

5. Condensation products as claimed in claim 1, wherein the molar ratio of (a):(c) is of from 100:1 to 1:20.

6. Condensation products as claimed in claim 1, which are obtainable by condensing
   (a) lysine
   (b) at least one compound selected from the group consisting of palmitic acid, stearic acid, lauric acid, octanoic acid, propionic acid, acetic acid, 2-ethylhexanoic acid, adipic acid, succinic acid, citric acid and mixtures thereof.

7. Condensation products as claimed in claim 1, which are obtainable by condensing
   (a) a basic amino acid selected from the group consisting of lysine, arginine, ornithine, tryptophane and mixtures thereof is condensed,
   (b) at least one compound of the group consisting of saturated carboxylic acids, unsaturated carboxylic acids, polybasic carboxylic acids, carboxylic acid anhydrides, hydroxycarboxylic acids, polyhydroxycarboxylic acids and mixtures thereof and
   (c) at least one compound of the group consisting of amines, lactams having 5 to 13 atoms the ring, non-proteinogenic aminocarboxylic acids, alcohols, alkoxylated amines, amino sugars, carbohydrates and sugar carboxylic acids in a molar ratio of (a):(b) of form 100:1 to 2:1 and (a):(c) of from 20:1 to 1:20.

8. Condensation products as claimed in claim 1, which are obtainable by condensing
   (a) lysine,
   (b) at least one compound selected from the group consisting of palmitic acid, stearic acid, lauric acid, octanoic acid, propionic acid, acetic acid, 2-ethylhexanoic acid, adipic acid, succinic acid, citric acid and mixtures thereof, and
   (c) at least one compound of the group consisting of epsiloncaprolactam, laurolactam, aminocaproic acid, aminolauric acid and mixtures thereof in a molar ratio of (a) to (b) of from 100:1 to 2:1 and (a):(c) of from 10:1 to 1:10.

9. Condensation products as claimed in claim 1, which are obainable by condensing
   (a) a basic amino acid selected from the group consisting of lysine, arginine. ornithine, tryptophane, and mixtures thereof,
   (b) at least one alkyldiketene having 1 to 30 carbon atoms in the alkyl group and optionally
   (c) at least one compound of the group consisting of amines, lactams, non-proteinogenic amino acids, alcohols, alkoxylated amines, amino sugars, carbohydrates, sugar carboxylic acid, and mixtures thereof.

10. A process for the production of condensation products of basic amino acids with copolymerizable compounds, which comprises condensing (a) a basic amino acid selected from the group consisting of lysine, arginine, ornithine, tryptophane and mixtures thereof, (b) a copolymerizable compound selected from the group consisting of saturated monobasic carboxylic acids, unsaturated monobasic carboxylic acids, polybasic carboxylic acids, carboxylic acid anhydrides, diketenes, monohydroxycarboxylic acids, polyhydroxycarboxylic acids and mixtures thereof, and optionally (c) at least one compound selected from the group consisting of amines, lactams, non-proteinogenic amino acids, alcohols, alkoxylated alcohols, alkoxylated amines, amino sugars, carbohydrates and sugar carboxylic acids in a molar ratio of (a):(b) of from 100:1 to 1:1 at a temperature of at least 120° C.

11. A process as claimed in claim 10, wherein the molar ratio of (a):(b) is of from 100:1 to 2:1.

12. A process as claimed in claim 10, wherein (a) a basic amino acid selected from the group consisting of lysine, arginine, ornithine, tryptophane and mixtures thereof is condensed, (b) at least one compound of the group consisting of saturated carboxylic acids, unsaturated carboxylic acids, polybasic carboxylic acids, carboxylic acid anhydrides, diketenes, monohydroxycarboxylic acids, polyhydroxycarboxylic acids and mixtures thereof and (c) at least one compound of the group consisting of amines, lactams, non-proteinogenic acids, alcohols, alkoxylated alcohols, alkoxylated amines, amino sugars, carbohydrates and sugar carboxylic acids are condensed in a molar ratio of (a):(b) of from 100:1 to 2:1 and (a) to (c) of from 20:1 to 1:20 at a temperature of from 140 to 300° C.

13. A process as claimed in claim 10, wherein (a) lysine, (b) at least one compound selected from the group consisting of palmitic acid, stearic acid, lauric acid, oleic acid, crotonic acid, linoleic acid, octanoic acid, propionic acid, acetic acid, 2-ethylhexanoic acid, adipic acid, succinic acid, citric acid and mixtures thereof are condensed.

14. A process as claimed in claim 10, wherein (a) a basic amino acid selected from the group consisting of lysine, arginine, ornithine, tryptophane, and mixtures thereof, (b) at least one alkyldiketene having 1 to 30 carbon atoms in the alkyl group and (c) at least one compound of the group consisting of amines, lactams having 5 to 13 atoms in the ring, alcohols, alkoxylated amines, alkoxylated alcohols, amino sugars, carbohydrates, sugar carboxylic acid, and mixtures thereof are condensed at temperatures of from 140 to 240° C.

* * * * *

UNITED STATES PATENT AND TRADEMARK OFFICE
CERTIFICATE OF CORRECTION

PATENT NO. : 6,034,204

DATED : March 7, 2000

INVENTOR(S): Bernhard MOHR, et al.

It is certified that an error appears in the above-identified patent and that said Letters Patent is hereby corrected as shown below:

On the Title page, item [ 75 ], the inventors' addresses are listed incorrectly. Item [ 75 ] should read as follows:

--- [75] Inventors: Bernhard Mohr, Schwäbisch Hall; Dieter Boeckh, Limburgerhof; Ralf Nörenberg, Frankfurt, all of Germany; Sherri Randall, Hamilton; Rajan Panandiker, West Chester; Eugene Paul Gosselink; LeeAnn Luipold, both of Cincinnati, all of Ohio. ---

Signed and Sealed this

Tenth Day of April, 2001

Attest:

NICHOLAS P. GODICI

Attesting Officer

Acting Director of the United States Patent and Trademark Office